United States Patent
Dragnea et al.

(10) Patent No.: US 7,284,162 B2
(45) Date of Patent: Oct. 16, 2007

(54) AGENT BASED ROUTER MONITORING, DIAGNOSTIC AND MAINTENANCE

(75) Inventors: Raluca Dragnea, Ottawa (CA); Brian McBride, Stittsville (CA); Peter Rabinovitch, Kanata (CA); Olivier Marce, Massy (FR); Thomas Levy, Paris (FR)

(73) Assignee: Alcatel, Paris (FR)

( * ) Notice: Subject to any disclaimer, the term of this patent is extended or adjusted under 35 U.S.C. 154(b) by 499 days.

(21) Appl. No.: 10/898,222

(22) Filed: Jul. 26, 2004

(65) Prior Publication Data

US 2005/0240835 A1 Oct. 27, 2005

(30) Foreign Application Priority Data

Apr. 7, 2004 (CA) .................................. 2463562

(51) Int. Cl.
*G06F 11/00* (2006.01)
(52) U.S. Cl. ............................................. 714/47; 714/4
(58) Field of Classification Search .................. 714/47, 714/48, 4; 709/202, 223, 224
See application file for complete search history.

(56) References Cited

U.S. PATENT DOCUMENTS

| | | | | |
|---|---|---|---|---|
| 5,363,493 | A * | 11/1994 | Unverrich | 714/47 |
| 6,580,979 | B2 * | 6/2003 | Payton et al. | 701/25 |
| 6,594,684 | B1 * | 7/2003 | Hodjat et al. | 709/202 |
| 6,708,199 | B2 * | 3/2004 | Ohtani et al. | 709/202 |
| 6,883,120 | B1 * | 4/2005 | Banga | 714/47 |
| 7,020,701 | B1 * | 3/2006 | Gelvin et al. | 709/224 |
| 2001/0051975 | A1 * | 12/2001 | Ohtani et al. | 709/202 |
| 2002/0138247 | A1 * | 9/2002 | Payton et al. | 703/22 |
| 2004/0054776 | A1 * | 3/2004 | Klotz et al. | 709/224 |
| 2004/0120706 | A1 * | 6/2004 | Johnson et al. | 398/10 |
| 2004/0153863 | A1 * | 8/2004 | Klotz et al. | 714/45 |
| 2005/0060598 | A1 * | 3/2005 | Klotz et al. | 714/4 |

FOREIGN PATENT DOCUMENTS

WO    WO 01/84329    11/2001

OTHER PUBLICATIONS

Tripathi A et al, Paradigms for Mobile Agent Based Active Monitoring of Network Systems, 2002 IEEE Network Operations and Management Symposium, Apr. 15, 2002, pp. 65-78.

(Continued)

*Primary Examiner*—Dieu-Minh Le
(74) *Attorney, Agent, or Firm*—Kramer & Amado, P.C.

(57) ABSTRACT

A distributed, multistage agent for monitoring, diagnosis and maintenance of network devices comprises an input/output interface for receiving input monitoring and diagnostic data relevant to operation of a first neighboring agent and transmitting output monitoring and diagnostic data relevant to operation of the host network device to a second neighboring agent. An agent process analyzes the input data and generates processed data characterizing operation of the host network device, using a local database which stores expected performance data on operation of said network device. The processed data is correlated with the expected data any error is signaled to the network operator. The agents may be designed as a multiple stage process, the stages being triggered by the data output by an earlier stage only when needed.

16 Claims, 2 Drawing Sheets

OTHER PUBLICATIONS

Karnik N M et al, Security in the Ajanta mobile agent system, Software Practice & Experience, Apr. 10, 2001, pp. 301-329, vol. 31, No. 4.

Naylor, M., The Use of Mobile Agents in Network Management Applications, Submitted in partial fulfilment of the requirements of Napier University for the degree of MSc Information Technology, School of Computing, Jan. 2000.

Luo, H., Agent-based Network Management System, A thesis submitted in partial fulfillment of the requirements for the degree of Master of Science in The Faculty of Graduate Studies, Department of Computer Sciences, The University of British Columbia, Aug. 2002.

* cited by examiner

AGENT BASED ROUTER MONITORING, DIAGNOSTIC AND MAINTENANCE

FIELD OF THE INVENTION

The invention is directed to communication networks and in particular to a system and method for distributed monitoring, diagnostic and maintenance of network devices.

BACKGROUND OF THE INVENTION

There is a distinct challenge in monitoring large scale networks and two fundamental approaches. One approach is to use a central system (e.g. a network management system NMS) that polls all the devices in the network and tries to understand what is happening. Another approach is to distribute the intelligence between the network devices so that they can self diagnose problems and only report exceptions, rather than the volumes of information that say everything is still fine.

There is significant industry research and development in area of network device management, but little in distributed router management with intelligent agents. Most networks currently use centralized network management systems (NMS), and local agents on most network devices, which operate as clients of the NMS. In this case, the local monitoring is enabled by software running on the respective node, for sending some data to the central NMS that ultimately provides the intelligence and management capabilities.

As network complexity grows, it is unlikely that the central systems can remain competitive and scale up according to the network growth. The disadvantages of the current centralized NMS solution are, to list a few:

Centralized monitoring, diagnostics and maintenance tools require significant network resources in order to effectively manage the network. Generally, only a limited amount of information is gathered from the devices in the network, in order to constrain the resource usage in a large network. As a result, many problems are not detected until after they occur.

Preventative maintenance requires volumes of detailed information to be processed, the vast majority of which is a result of normal operation. Centralized systems cannot manage the amount of information in a large network to offer significant preventative maintenance capabilities.

Central systems require resources to function, such as the ability to retrieve data from the nodes. When the network is misbehaving, and when the maintenance systems are required to be operational by definition, the resources may not be available, i.e. the central system may not be able to communicate with the devices in its network.

The topology of the network must be known when using centralized management system solutions.

It is also known to use systems external to a network device that analyze more deeply a specific node behavior, such as routing. While the external mechanisms may provide a more in-depth analysis of the device operation, these systems use extensive computing resources. As a result, equipping a network device with such a complex mechanism is not economically feasible due to the limited amount of physical resources available at the node. In addition, the external systems do not report the problem immediately due to the need of off-line computations; there is no way to retrieve synthetic results at a speed compatible with quick reaction to a detected anomaly.

Some network devices are enabled with embedded monitoring engines. However, the existing embedded mechanisms are very rough and too weak to provide the network operator with meaningful information on the behavior of the host network device. Such embedded mechanisms generally compare counter values with fixed values and trigger alerts when the threshold is exceeded.

There is a need to provide a network device (such as a router or a switch) with an agent for distributed monitoring and diagnosis of network operation. Such an agent will operate as an intelligent distributed agent to filter the data provided to the NMS, thus reducing the network traffic overhead transmitted to the central management system.

There is also a need to provide a network device with a multistage intelligent monitoring and diagnostic agent which incrementally triggers the resource-consuming monitoring and analysis modules at the router as need be.

SUMMARY OF THE INVENTION

It is an object of the invention to provide a system and method for distributed monitoring, diagnostic and maintenance of network devices, that alleviate totally or in part the drawbacks of the prior art systems and methods.

It is another object of the invention to provide a system and method for distributed monitoring, diagnostic and maintenance of network devices that reduces the network traffic overhead transmitted from the network nodes to the central management system.

Still another object of the invention is to provide a network device with a multistage intelligent monitoring and diagnostic agent which incrementally triggers resource-consuming stages for more in-depth analysis and diagnostic, as need be, based on the device behavior.

Advantageously, locally collected network device operational data is correlated with equivalent data received from neighboring network devices, for consolidating the data referring to a particular event, so that the network traffic overhead is significantly reduced. As well, the invention enables a network provider with flexibility in customizing the network behavior to particular users, by using global high level policies and rules that may be tailored once particulars about network device operation in the context of the respective network are known.

Use of local agents minimizes network resource usage, while providing intelligence on establishing the causes of the misbehavior when the central management is out of communication. In addition, when the network is unstable, local agents are capable of observing local phenomena.

The invention also allows for real-time monitoring of network devices against global high level policies and rules to detect problems. By providing embedded network intelligence at the network device level, the networks can monitor themselves and adapt to changing topologies, without the need of costly external mechanisms.

Use of an embedded intelligent agent enables for both a continuous monitoring of network device operation, and an incremental, more in-depth analysis of the device operation. Based on the results of a basic monitoring and diagnostic stage, various degrees of monitoring and diagnostics are possible, as desired, or as need be. This enables intelligent network device resource utilization, which are used according to the type/level of monitoring and diagnostics stage.

Still another advantage is that the invention works for any type of network, since the agents do not need to know the topology of the network to function.

BRIEF DESCRIPTION OF THE DRAWINGS

The foregoing and other objects, features and advantages of the invention will be apparent from the following more particular description of the preferred embodiments, as illustrated in the appended drawings, where.

DETAILED DESCRIPTION

Figure 1:
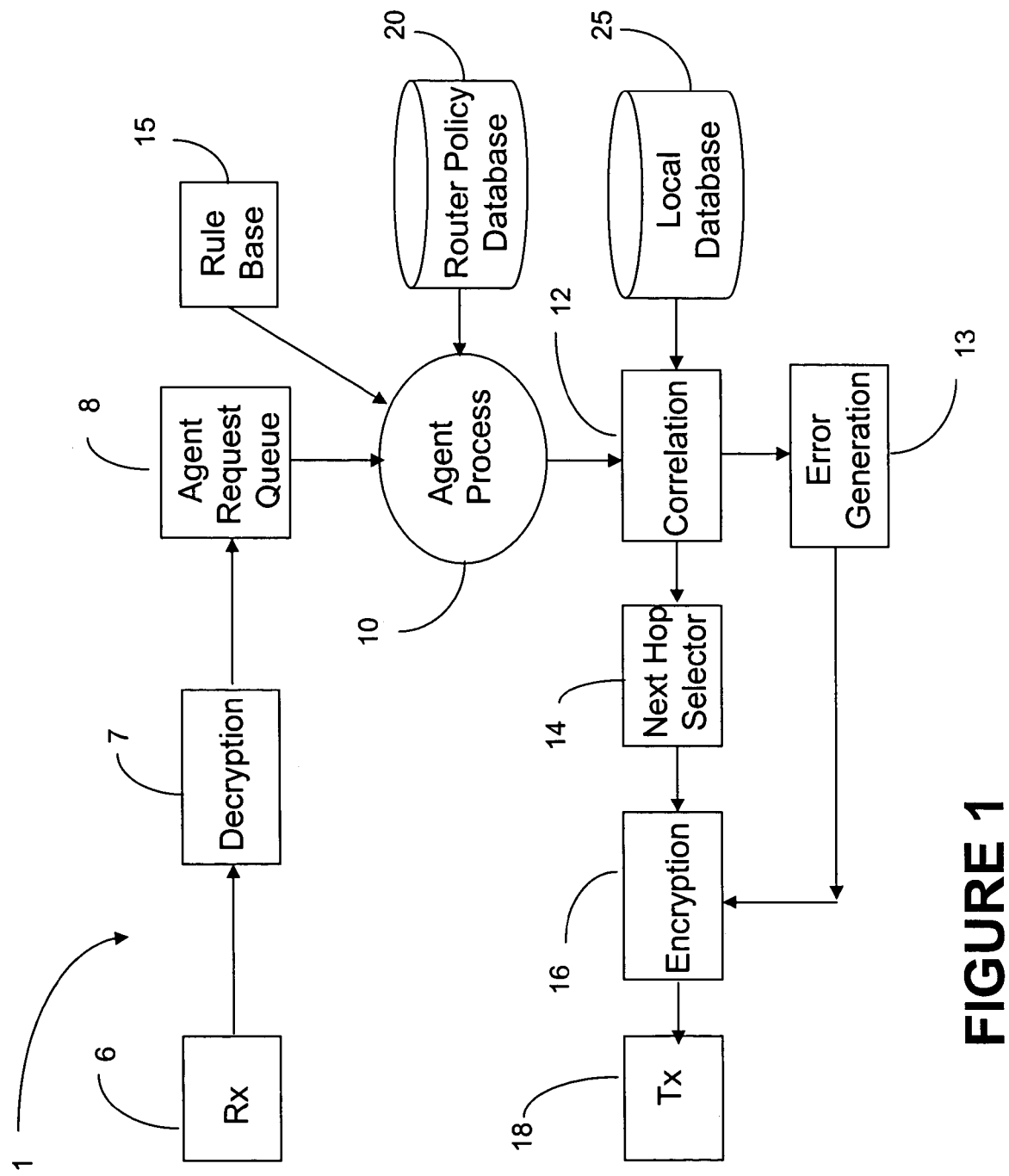
FIG. 1 shows the main units of a monitoring, diagnostics and maintenance agent according to an embodiment of the invention.

FIG. 1 shows the main units of a monitoring, diagnostics and maintenance agent mechanism 1 (herein called agent) according to an embodiment of the invention. Agent 1 is embedded in an existing network device (router or switch) and is always present. The agents described here are not just client agents, but rather they are in a client-server relationship with all neighboring agents they communicate with. A neighboring agent here is an agent located on a network device physically connected to the device hosting the agent under consideration.

Each agent exchanges with neighboring agents data relevant to the network device operation, for enabling detection or faulty operation and also for enabling consolidation of messaging with the NMS (network management system). In this specification, the term 'data' is used to specify any type of information relevant to operation of the router, including performance monitoring data, messaging, alarms, etc. It is to be understood that this data is not limited to the above examples, but can be any type of information that the network provider or user may wish to be considered. Also, in this specification the network device may be referred as a router; it is to be understood that the invention is applicable to network devices operating at layer-2 and above.

By distributing the tasks of monitoring, diagnostics and maintenance between routers, the NMS tasks are reduced, enabling more efficient and faster management of the network, while the overhead messaging between the NMS and the routers diminishes significantly. In addition, an agent 1 does not need to know the network topology; rather it can discover and report the network topology, which makes it very well suited to mobile and ad-hoc networks.

In order to enable communication with other agents, agent 1 is provided with a receiver 6 and a transmitter 18. Preferably, the agent 1 also uses decryption and encryption units 7 and respectively 16 for data authentication necessary for security reasons.

For the forward direction, agent 1 receives monitoring and diagnostics data from other agents via the receive block 6 using the normal network communication protocols, such as IP. The decryption block 7 authenticates and decrypts the data which is then placed into an agent request queue 8.

The agent process 10 continuously monitors the agent request queue 9 and processes the data in the order established by the queue 9, at the first available opportunity. When a request is taken for processing, the agent process 10 decodes the data and applies the logic requested by that specific data, after consulting a rule base 15 and a policy database 20. The rule base 15 includes a plurality of rules that define the correct operation of the router. The router policy database 20 maintains a plurality of policies applicable to the respective particular router.

Various methods of detecting router behaviors may be envisaged and provided in the rule base 15 and router policy database 20, respectively. Statistics may also be collected for enabling the NMS/operator to detect certain systematic abnormalities or potential for errors, in order to advise the respective network provider or user of the problem. For example, such statistics may identify the router responsible with the worst routing practices, enabling the provider/user to take any suitable corrective measures.

The agent process 10 forwards the information relevant to the respective data, hereinafter called the processed data, to a correlation module 12. Module 12 correlates this processed data with equivalent data stored in a local database 25 to detect any inconsistencies. The accuracy of the detection must be sufficient to provide the NMS/operator with enough relevant information.

The data output by correlation module 12, hereinafter called the correlated data, and that do not specify errors is forwarded on to a next hop selector 14 to continue through the network. Next hop selector 14 chooses a neighboring device (router, switch) and implicitly the respective neighboring agent to consult. Preferably, this selection is performed via a random path selection or random multiple path selection mechanism. A variety of next hop selection mechanisms can be used, the invention is not limited to any particular such mechanism. After the next hop device is identified, the data is encrypted in encryption block 16 so that it can be forward to the next agent in a secure manner and then transmitted to the next agent using transmitter 18.

If there is a problem, an error generation module 13 is consulted to send an error message to the central management system. The error message may contain a simple indication of an error, or may provide additional information on the particulars of the error, with various degrees of sophistication. Before transmission at 18, the error information is preferably encrypted at shown at 16.

Figure 2:
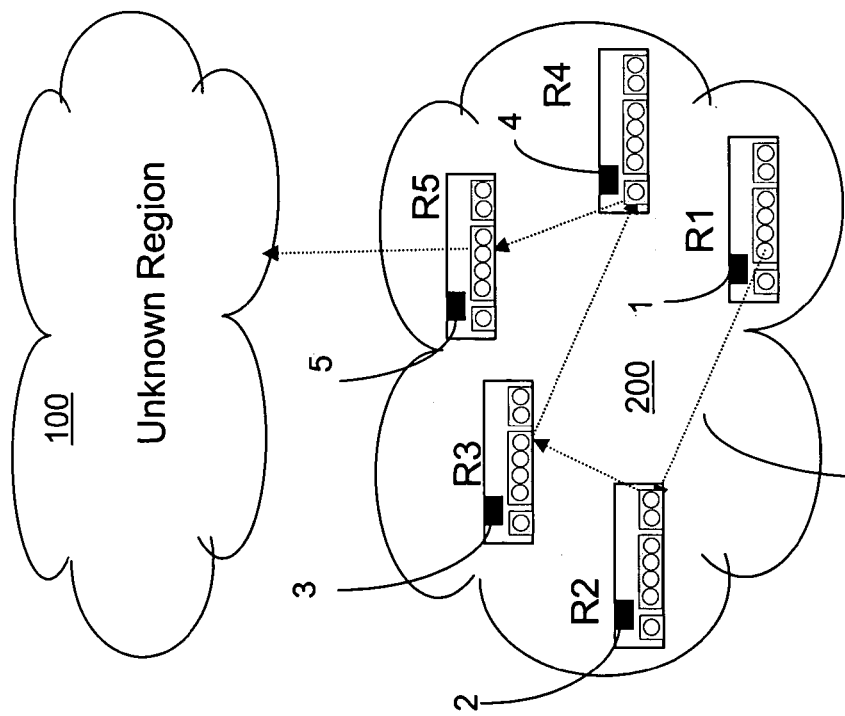
FIG. 2 shows operation of the agent of FIG. 1.

FIG. 2 shows the distributed agent at work. In this example, the network devices are routers denoted with R1-R5. The dotted lines indicate a "traveling" agent 30 thereby the routers exchange their operational data with a neighboring router. In this example, data from agent 1 hosted on router R1 travels to neighboring agent 2 hosted on router R2, etc. As discussed previously, R2 is the next hop from R1, selected by the agent 1 on R1 using the respective selection mechanism 14 (see FIG. 1). If any of the agents 1-5 detects an error, the error message is transmitted to the central management so that the operator may take appropriate action.

As an example, let's assume that the functionality that is monitored and analyzed by the agent 1 is the routing behavior of the routers in sub-network 100 of FIG. 2. Particularly, let us assume that the BGP (border gateway protocol) routing table contents and evolution is of interest. BGP is a routing protocol whose aim is to exchange routing (prefixes+next hop, etc. . . . ) information between autonomous systems (AS's). An autonomous system or routing domain is a group of internet protocol (IP) routers or label switching routers (LSRs) exchanging routing information using a common routing protocol such as IGP (Interior Gateway Protocol) and controlled by a common network administrator on behalf of a single administrative entity. An autonomous system shares routing information with other autonomous systems using the BGP.

The primary objective in this case is to give operators the most pertinent information on any erroneous, abnormal or suspicious routing table content. For example, suspicious or error source behaviors could be lack of aggregation, non-conformance to RIR's allocation policies, multi-homing (addressing scheme in IS-IS routing that supports assignment of multiple area addresses), etc.

Each router R1-R5 of the sub-network 100 is equipped with a respective agent 1-5, the agents monitoring and analyzing, in this example, the routing behavior of the router R1. As indicated above, the agents 1-5 on R1-R5 perform the respective local analysis of the BGP routing table content and evolution, using the rule base 15 and the router policy database 20. Then, the agents also perform the correlation with the respective routing data received from the neighboring agents, and transmit any error detected as a result of the correlation to the NMS.

However, some of the tasks performed by the agent may be more resource consuming than others. For example, early analysis showed that it is unrealistic in terms of available resources to analyze BGP messages to detect suspicious behaviors. The growth of the routing table size is not always caused by the growth of the network, but also comes from usual practices in BGP configuration. Although these configuration policies are locally relevant, they often impact the entire network (Internet), since the BGP does not offer any efficient mechanism to restrict diffusion of a route.

The objective of the embedded routing monitoring of this example is to detect lack of aggregation, multi-homing and load balancing with a view to reducing the content of the forwarding information base (FIB). Also, the embedded routing monitoring in this example allows operators to have a "real-time" view of the behavior of the respective routers and AS's. In other words, each embedded agent may provide a local view of the BGP behaviors. It is to be noted that detection of such cases does not necessarily means an error in operation, but could signal a mode of operation due to application of various valid BGP policies. This allows a better use of hardware resources, which are expensive and critical in the context of high-speed networks. While waste coming from lack of aggregation can be easily fixed, this is not the case for load balancing or multi-homing. Up to now, all of these practices are not only tolerated, but they are also exported in the whole Internet.

Furthermore, the agents may be designed to monitor and analyze the router behavior in a multiple stage process, the stages being triggered by the data output by an earlier stage only when needed. For example, the first monitoring and analysis stage continuously runs to perform basic tasks, selected to consume low router resources. The output of the first stage is used to trigger a second stage, based on the type and level of error or abnormality detected by the first stage, if any. Since the analysis performed in the second stage is specialized and more complex than that of the basic stage, the cost of operating this stage is higher due to higher resource consumption. The cost of operating the agent may be reduced since the second stage operates only if necessary (as pre-set by the network provider or user) and based on the output of the first stage. Additional specialized and more complex stages may also be used; this architecture can be extended to any level.

Figure 3:
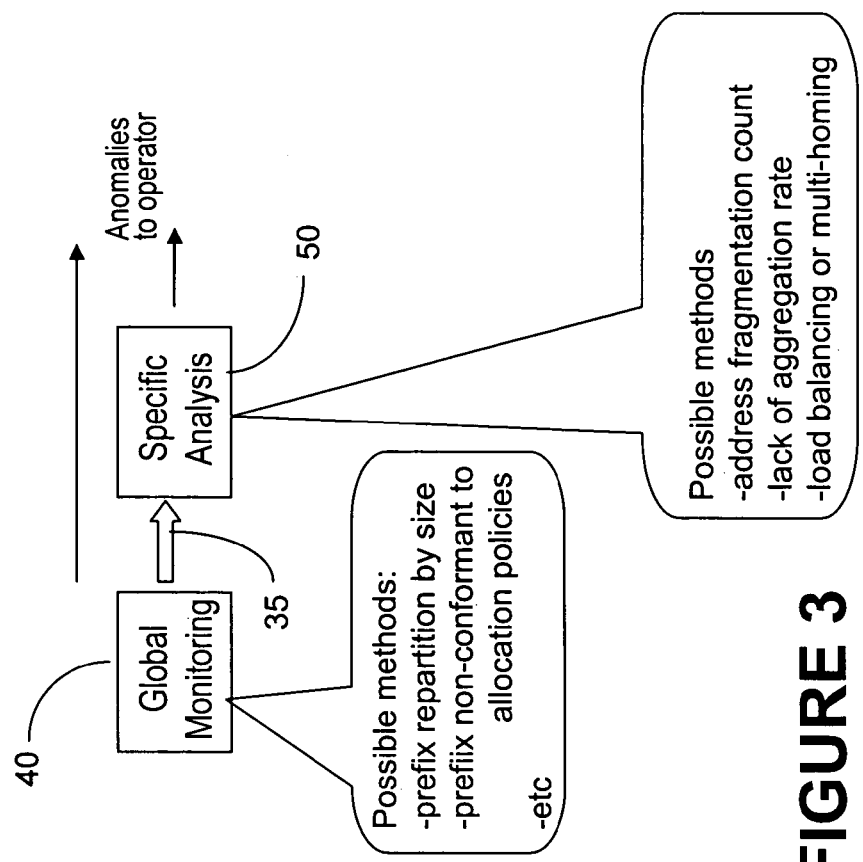
FIG. 3 illustrates an embodiment of a multi-stage monitoring and analysis agent.

FIG. 3 shows a two-stage mechanism. In this example, the first stage 40 provides global monitoring, which as indicated above, uses fewer resources and runs continuously. The output 35 of stage 40 triggers the second stage 50, using e.g. pre-set thresholds. Stage 50 performs specific analysis of data 35. and as such is more resource consuming; it also operates on a subset of data identified during the first stage. The operator may receive error messages from the first stage directly, or from both the first and the second stage.

Various methods may be used to perform the analysis of e.g. the routing data, such as monitoring prefix repartition by size, or detection of prefix non-conformance with allocation policies, etc. If any of the results of stage 40 indicates routing table abnormalities, the suspicious data is provided to stage 50, for in-depth analysis. Again, there are various methods available in this second stage, such as address fragmentation count, determining lack of aggregation rate, load balancing or multi-homing, etc. These methods are described briefly next.

Load balancing is characterized by the fact that a route advertised for a prefix has the same origin as a route for a neighboring prefix, but the paths for these prefixes are different. Two prefixes are considered as neighbors if the sets of the respective covered addresses are adjacent. Therefore, load balancing is detected if there exists a prefix Pb neighbor with a prefix Pa, or Pb covers Pa, such that the respective routes have the same origin but distinct physical paths.

Multi-homing is characterized by the fact that a prefix is advertised by a network device through several providers. In fact, the example considers a 'provider aggregate-able' allocated prefixes approximation, which is justified by the way the prefixes are allocated to independent providers in IPv4. With this approximation, multi-homing creates 'holes' in the routing base because the customer advertises its prefixes separately from the prefix of its provider. A 'hole' is a prefix whose route has different characteristics (at least the origin of the path) than the route of its covering prefix. There should be no hole for single-homed prefixes, because the customer doesn't need to announce this prefixes beyond its provider. Therefore, multi-homing is detected if there exists a prefix Pb covering Pa, and having different.

Lack of aggregation is characterized by the fact that a prefix is advertised by a network device with the same characteristics (mainly the physical path) as a neighbor and aggregate-able prefix. Therefore, lack of aggregation for a prefix X/n is detected if the bit of level n for X is 1 and there exists a NLRI Y/n (Y being X with bit level n=0) such that the physical paths for the best routes are similar.

We claim:

1. An agent based system for monitoring, diagnostic and maintenance of a network device said agent based system being resident on the network device, comprising:
    an input/output interface for receiving input monitoring and diagnostic data relevant to operation of a first neighboring agent and transmitting output monitoring and diagnostic data relevant to operation of said network device to a second neighboring agent;
    an agent process for analyzing said input data and generating processed data characterizing operation of said network device;
    a local database for storing expected performance data on operation of said network device; and
    a correlation unit for correlating said processed data with expected data to detect a basic error in said operation of said network device, and assembling said output data.

2. The agent of claim 1, further comprising a next hop selector for choosing said second neighboring agent.

3. The agent of claim 1, further comprising an error generator for generating an error message whenever said processed data is different from said expected data.

4. The agent of claim 3, wherein said error generator provides additional information on the particulars of an error.

5. The agent of claim 1, further comprising an agent request queue at the input side of said agent processor that organizes said input data in a queue according to a preset rule.

6. The agent of claim 1, further comprising means for storing a plurality of rules for defining the correct operation of said network device.

7. The agent of claim 1, further comprising means for storing a plurality of policies applicable to said particular network device.

8. The agent of claim 1, wherein said local database further collects statistics for enabling said correlation unit to detect certain systematic abnormalities in the operation of said network device.

9. The agent of claim 1, wherein said input-output interface comprises a receiver for receiving said input data from said first agent and a transmitter for transmitting said output data to said second agent.

10. The agent of claim 1, wherein said input-output interface comprises decryption means for decrypting said input data received from said first agent and encryption means for encoding said output data before transmission to said second agent.

11. The agent of claim 2, wherein said next hop selector includes random path selection mechanism.

12. The agent of claim 2, wherein said next hop selector includes a random multiple path selection mechanism.

13. An agent based method for monitoring performance of a network device, comprising:
   a) providing a network device with an embedded agent, connected to a first neighboring agent over an incoming transmission path for receiving input monitoring and diagnostic data relevant to operation of said first neighboring agent;
   b) establishing an outgoing transmission path from said network device to a second neighboring agent for transmitting output monitoring and diagnostic data relevant to operation of said network device;
   c) at said embedded agent, analyzing said input data and generating processed data characterizing operation of said network device;
   d) correlating said processed data with expected data available at said network device to detect a basic error in said operation of said network device, and assembling said output data.

14. The method of claim 13, wherein step c) comprises:
   arranging said input data in a queue at the input of an agent process;
   verifying said input data against one or more rules for defining the correct operation of said network device;
   verifying said input data against one or more policies applicable to said particular network device; and
   generating said processed data to provide information about operation of said network device in the context of operation of a first neighboring network device hosting said first neighboring agent.

15. The method of claim 13, wherein step d) comprises: storing expected performance data on operation of said network device; and correlating said processed data with expected data and assembling said output data.

16. An embedded agent for monitoring operation of a network device comprising:
   a first stage for determining basic errors in operation of said network device based on a plurality of thresholds for each type and level of errors; and
   a second stage specialized for determining complex errors in operation of said network device,
   wherein said first stage runs continuously, and said second stage is triggered by said first stage whenever one of said thresholds is violated.

* * * * *